United States Patent Office 3,299,057
Patented Jan. 17, 1967

3,299,057
2-CHLORO SUBSTITUTED-4-AZAPHENO-THIAZINES
Albert Gross and Kurt Thiele, Frankfurt am Main, Germany, assignors to Deutsche Gold- und Silber-Scheideanstalt vormals Roessler, Frankfurt am Main, Germany
No Drawing. Filed Oct. 21, 1965, Ser. No. 500,167
Claims priority, application Germany, Apr. 13, 1962, D 38,675
3 Claims. (Cl. 260—243)

This application is a continuation-in-part of copending application Serial No. 271,893, filed April 10, 1963, now abandoned.

The present invention relates to novel 2-chloro azaphenothiazine derivatives which are of the formula

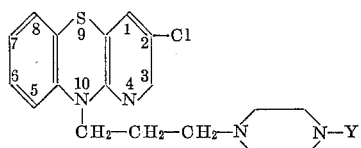

wherein Y represents —CH$_2$—CH$_2$—OH or
—CH$_2$—CH$_2$—O—CO—CH$_3$ or, in other words, the two compounds 10-{3-[4-(2-hydroxyethyl) - piperazino] - propyl-(1)} - 2-chloro-4-azaphenothiazine and 10-{3-[4-(2-acetoxyethyl)-piperazino]-propyl-(1)}-2-chloro-4-azaphenothiazine and their pharmaceutically acceptable acid addition salts and quaternary ammonium salts and according to the invention it was found that these two compounds possess an unexpectedly high cataleptic action and sedative action as compared to previously known azaphenothiazines which do not have a chlorine atom in the 2-position and also as compared to other (not previously known) closely related compounds which do have a chlorine atom in the 2-position. The compounds in question have a strong neuroleptic action as well as a psychosedative action. Neuroleptics are pharmaceuticals used in the more radical psychic disturbances of the total complex of endogenic psychoses (mental illnesses such as schizophrenia, psychotic disturbances, such as delusions and hallucinations) and permit quieting of troubled mental patients or to free such patients from their mental delusions without causing the patients to fall asleep or to hold them in a type of continuous narcosis. A simultaneous sedative activity is a welcome supplemental action in the therapeutic application of a neuroleptic but is not a necessary requirement for such application. Psychosedatives influence states of fear, excitement and tension and can be useful in treatment of patients not mentally ill. In both neuroleptics and psychosedatives it is important that they do not impair consciousness, judgment and ability to think. In view of the very strong specific action of the compounds according to the invention, they are especially suited for use in therapy over long periods of time.

The following examples will illustrate the preparation of the compounds according to the invention.

*Example 1.—10-{3-[4-(2-hydroxyethyl)-piperazino]-propyl-(1)}-2-chloro-4-azaphenothiazine*

(a) 23.5 g. of 2-chloro-4-azaphenothiazine (prepared as described in application Serial No. 227,535, filed October 2, 1962), now U.S. Patent 3,200,116, dissolved in 150 ml. of toluene were reacted with 9.8 g. of a 50% sodium amide suspension in toluene while refluxing. Thereafter 16.3 g. of 2-piperazino-propyl chloride dissolved in 100 ml. of toluene were added dropwise while continuing the refluxing. The mixture was stirred for a further two hours and subsequently washed twice with water and shaken out with dilute HCl. The resulting aqueous solution was rendered alkaline with Na$_2$CO$_3$ and extracted with benzene. The benzene solution was dried with K$_2$CO$_3$ and evaporated to dryness. The residue was distilled under vacuum. 19.5 g. of the base, 10-[3-piperazino-propyl-(1)] - 2-chloro-4 - azaphenothiazine, with a boiling point of 245–255° C. at 0.01 torr, were obtained.

(b) 36 g. (0.1 mol) of the base as prepared under (a) dissolved in 150 cc. of butanol were refluxed for 4 hours with 10 g. (0.125 mol) of ethylene chlorohydrin and 21 g. (0.15 mol) of potassium carbonate. The salts were then filtered off from the reaction mixture and the filtrate concentrated. The residue was distilled under vacuum. The resulting 4-hydroxy ethyl substituted piperazino compound of the formula above had a boiling point of 275–280° C. at 0.01 torr. The yield was 88% of theory.

*Example 2.—10-{3-[4-(2-acetoxyethyl)-piperazino]-propyl-(1)}-2-chloro-4-azaphenothiazine*

40.5 g. (0.1 mol) of the base prepared as in Example 1b were dissolved in 40 cc. of benzene and reacted at 40–50° C. with 14 cc. (0.15 mol) acetic acid anhydride in the presence of 4 cc. of pyridine. The reaction mixture was allowed to stand for 24 hours and then rendered alkaline with Na$_2$CO$_3$. The aqueous solution was extracted several times with benzene and the benzene solutions combined, dried with K$_2$CO$_3$ and evaporated to dryness. 41 g. of the crude base were obtained which was converted to the dihydrochloride. 43 g. of the salt were obtained which after recrystallization from dimethylformamide-alcohol had a melting point of 245° C.

The following table compares the sedative activity, toxicities and cataleptic activities of the compounds according to the invention with corresponding azaphenothiazine compounds not substituted by chlorine, as well as of other 2-chloro substituted azaphenothiazines and their non-substituted counterparts.

The sedative activity was determined in a selenium cell apparatus after oral administration of the substances in question to mice and is expressed as ED 50 in mg./kg.

The toxicities (LD 50 mg./kg.) were carried out on mice according to the method of Miller and Tainter upon intraperitoneal injection. The period of observation was 24 hours.

The cataleptic activity was determined on mice after intraperitoneal injection of the substance tested. The substance under investigation was administered in various logarithmically increasing doses and the catalepsy measured by the method described in Arzneimittelforschung 8, 489 (1958).

The compounds tested were as follows:

(a) 10-[3-dimethylamino-propyl-(1)]-4-azaphenothiazine
(a′) the 2-chloro substituted counterpart
(b) 10-[2-dimethylamino-propyl-(1)]4-azaphenothiazine
(b′) the 2-chloro substituted counterpart
(c) 10-[3-(4-methyl-piperazino)-propyl-(1)]-4-azaphenothiazine
(c′) the 2-chloro substituted counterpart
(d) 10-[3-(4-acetoxyethyl-homopiperazino)-propyl-(1)]-4-azaphenothiazine
(d′) the 2-chloro substituted counterpart
(e) 10-[3-(4-hydroxyethyl-homopiperazino)-propyl-(1)]-4-azaphenothiazine
(e′) the 2-chloro substituted counterpart
(f) 10-[3-(4-acetoxyethyl-piperazino)-propyl-(1)]-4-azaphenothiazine
(f′) the 2-chloro substituted counterpart (g) 10-[3-(4-hydroxyethyl-piperazino)-propyl-(1)]-4-azaphenothiazine
(g') the 2-chloro substituted counterpart

| Compound | Sedative activity ED 50 mg./kg. | Toxicity LD 50 mg./kg. | Cataleptic activity ED 50 mg./kg. |
|---|---|---|---|
| a | 17.3 | 115±11 | >16. |
| a' | 17 | 118±6 | 7.8±5.4. |
| b | 60 | 65±4 | About 16. |
| b' | 17 | 66±4 | >8 (max. 20%). |
| c | 107 | 174±8 | 15±2.8. |
| c' | 38 | 182±8 | 7.8±1.9. |
| d | 66 | 185±8 | >40. |
| d' | 46 | 115±7 | 18.4±3.2. |
| e | 45 | 222±10 | >40. |
| e' | 22 | 154±6 | >16 (max. 10%). |
| f | 16 | 148±7 | 19±2.5. |
| f' | 3 | 161±11 | 1.3±0.4. |
| g | 16 | 139±4 | About 30. |
| g' | 1.5 | 143±10 | 1.7±0.5. |

We claim
1. An azaphenothiazine compound of the formula

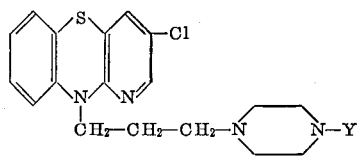

wherein Y is selected from the group consisting of —CH$_2$—CH$_2$—OH and —CH$_2$—CH$_2$—O—CO—CH$_3$.
2. 10-{3-[4-(2-hydroxyethyl)-piperazino]-propyl-(1)}-2-chloro-4-azaphenothiazine.
3. 10-{3-[4-(2-acetoxyethyl)-piperazino]-propyl-(1)}-2-chloro-4-azaphenothiazine.

References Cited by the Examiner
FOREIGN PATENTS
840,892  7/1960  Great Britain.
893,284  4/1962  Great Britain.
654,426  12/1962  Canada.

JOHN D. RANDOLPH, *Primary Examiner.*